(12) United States Patent
Showalter

(10) Patent No.: US 9,551,244 B2
(45) Date of Patent: Jan. 24, 2017

(54) ELECTRIC MOTOR DRIVEN SIMPLE PLANETARY CAM PHASER

(71) Applicant: BorgWarner Inc., Auburn Hills, MI (US)

(72) Inventor: Dan J. Showalter, Plymouth, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/648,098

(22) PCT Filed: Nov. 22, 2013

(86) PCT No.: PCT/US2013/071448
§ 371 (c)(1),
(2) Date: May 28, 2015

(87) PCT Pub. No.: WO2014/092973
PCT Pub. Date: Jun. 19, 2014

(65) Prior Publication Data
US 2015/0345345 A1    Dec. 3, 2015

Related U.S. Application Data

(60) Provisional application No. 61/735,514, filed on Dec. 10, 2012.

(51) Int. Cl.
| | |
|---|---|
| F01L 1/34 | (2006.01) |
| F16H 1/28 | (2006.01) |
| F01L 1/344 | (2006.01) |
| F01L 1/352 | (2006.01) |

(52) U.S. Cl.
CPC ............... *F01L 1/34* (2013.01); *F01L 1/344* (2013.01); *F01L 1/352* (2013.01); *F16H 1/28* (2013.01); *F16H 2001/2881* (2013.01); *Y10T 29/49295* (2015.01)

(58) Field of Classification Search
CPC .............. F01L 1/34; F01L 1/344; F01L 1/352; F16H 1/28; F16H 2001/2881
USPC ................................ 123/90.17, 90.31, 90.15
See application file for complete search history.

(56) References Cited

U.S. PATENT DOCUMENTS 8,677,963 B2 * 3/2014 Stoltz-Douchet ....... F01L 1/344
123/90.17

\* cited by examiner

*Primary Examiner* — Ching Chang

(57) ABSTRACT

A cam phaser (10) dynamically adjusts a rotational relationship of a camshaft (24) of an internal combustion engine with respect to an engine crankshaft (34). A cam sprocket (20) can be driven by an endless loop power transmission member connected to a drive sprocket (36) mounted for rotation with the engine 5 crankshaft (34). The cam phaser (10) can include a planetary gear drive train (12) having a centrally located sun gear (14) connected for rotation with the cam sprocket (20), a ring gear (18) connected for rotation with the camshaft (24), and a plurality of planet gears (16a, 16b) supported by a carrier (22) in meshing engagement between the sun gear (14) and the ring gear (18). A phase adjustment gear (26) can be 10 connected for rotation with the carrier (22). The sun gear (14) can drive the planet gears (16a, 16b) in rotation thereby causing the ring gear (18) to be driven in rotation. Rotational movement the phase adjustment gear (26) can adjustably vary a cam phase position of the camshaft (24) relative to the crankshaft (34).

15 Claims, 2 Drawing Sheets

ELECTRIC MOTOR DRIVEN SIMPLE PLANETARY CAM PHASER

FIELD OF THE INVENTION

The invention relates to a planetary gear assembly for dynamically adjusting a phase angle or rotational relationship of a camshaft with respect to an engine crankshaft to improve fuel efficiency of an internal combustion engine.

BACKGROUND

There are many different devices currently in production to achieve this phasing of the engine camshaft. For example, see U.S. Patent Application Publication No. 2010/0064997; U.S. Patent Application Publication No. 2004/0206322; U.S. Pat. Nos. 7,506,623; 7,047,923; 6,971,352; 6,138,622; 6,129,061; 5,680,837; 5,361,736; 5,327,859; 4,850,427; and German Patent No. DE4110195. While each of these devices appear suitable to perform the intended function, it has been found that the devices have high overall cost and/or large clearance dimensions. It would desirable to provide a cam phaser with lower clearance dimensions and at a lower overall cost.

SUMMARY

A cam phaser is disclosed for dynamically adjusting a rotational relationship of a camshaft of an internal combustion engine with respect to an engine crankshaft. A cam sprocket can be driven by an endless loop power transmission member connected to a drive sprocket mounted for rotation with the engine crankshaft. The cam phaser can include a planetary gear drive train having a centrally located sun gear connectable for rotation with the cam sprocket. A ring gear can be connectable for rotation with the camshaft, and a plurality of planet gears can be supported by a carrier in meshing engagement between the sun gear and the ring gear. A phase adjustment gear can be connected for rotation with the carrier. The sun gear can drive the planet gears in rotation, thereby causing the ring gear to be driven in rotation. Rotational movement the phase adjustment gear can adjustably vary a cam phase position of the camshaft relative to the crankshaft.

A simple planetary gearset with a fixed carrier drives the camshaft at a ratio that when multiplied by the ratio between the engine crank sprocket and the phaser input sprocket results in an overall combined ratio of 0.5:1. An electric motor is arranged such that it can rotationally drive the carrier to achieve the desired cam phasing. A sensor can be provided to supply a feedback signal to a controller of the electric motor to measure a current position of the cam sprocket relative to the camshaft to determine if any cam phase position adjustment is required. The phase adjustment gear can be a worm gear. The sun gear, the ring gear, and the planet gears can have helical teeth.

A method for assembling and for dynamically adjusting a rotational relationship of a camshaft of an internal combustion engine with respect to an engine crankshaft is disclosed. A cam sprocket can be driven by an endless loop power transmission member connected to a drive sprocket mounted for rotation with the engine crankshaft. The method can include assembling a planetary gear drive train having a centrally located sun gear connectable for rotation with the cam sprocket. A ring gear can be connectable for rotation with the camshaft, and a plurality of planet gears can be supported by a carrier in meshing engagement between the sun gear and the ring gear. A phase adjustment gear can be connected for rotation with the carrier. The sun gear can drive the planet gears in rotation, thereby causing the ring gear to be driven in rotation. Rotational movement of the phase adjustment gear can adjustably vary a cam phase position of the camshaft relative to the crankshaft.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
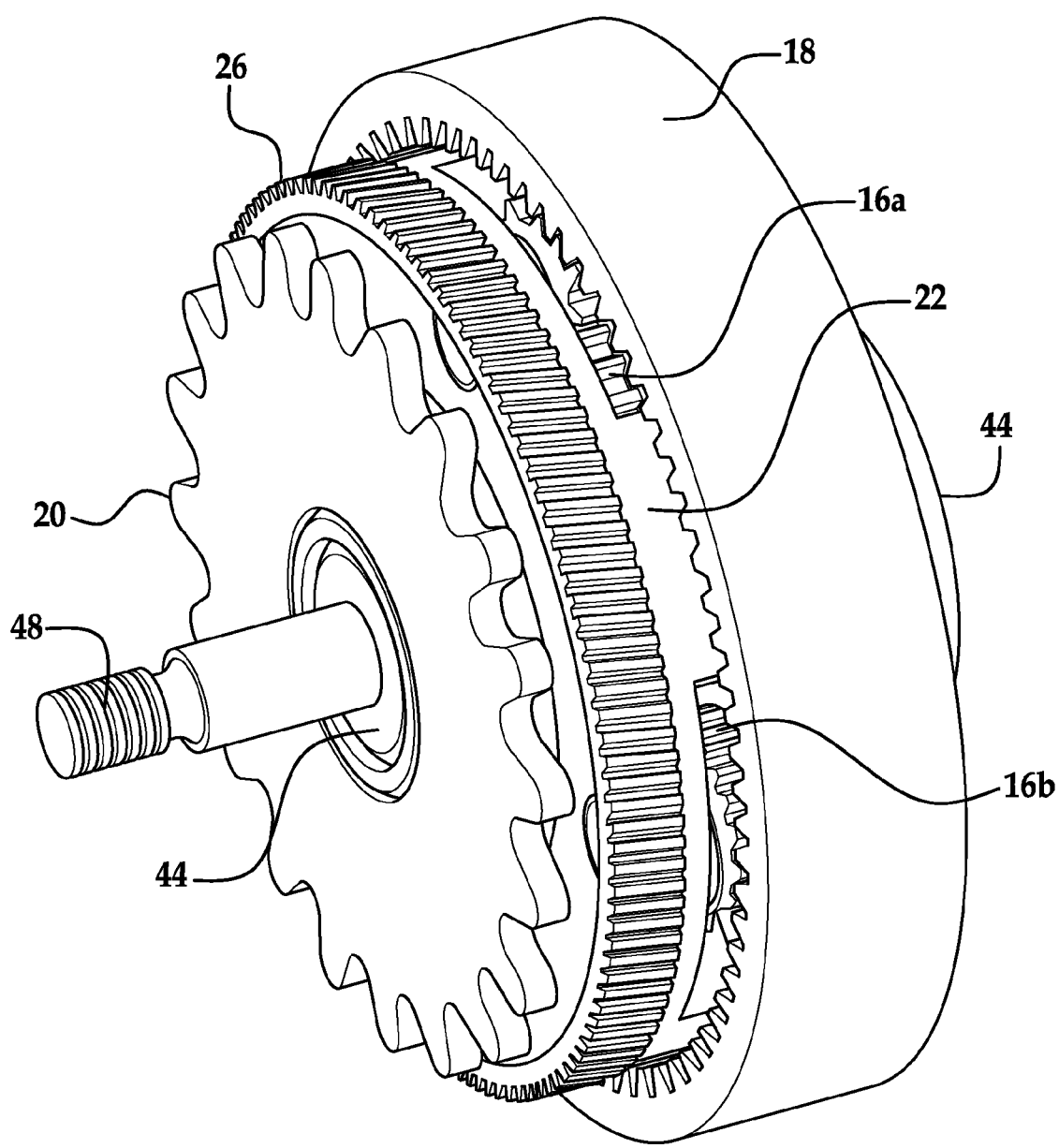
FIG. 1 is a perspective view of an electric motor driven simple planetary cam phaser.
Figure 2:
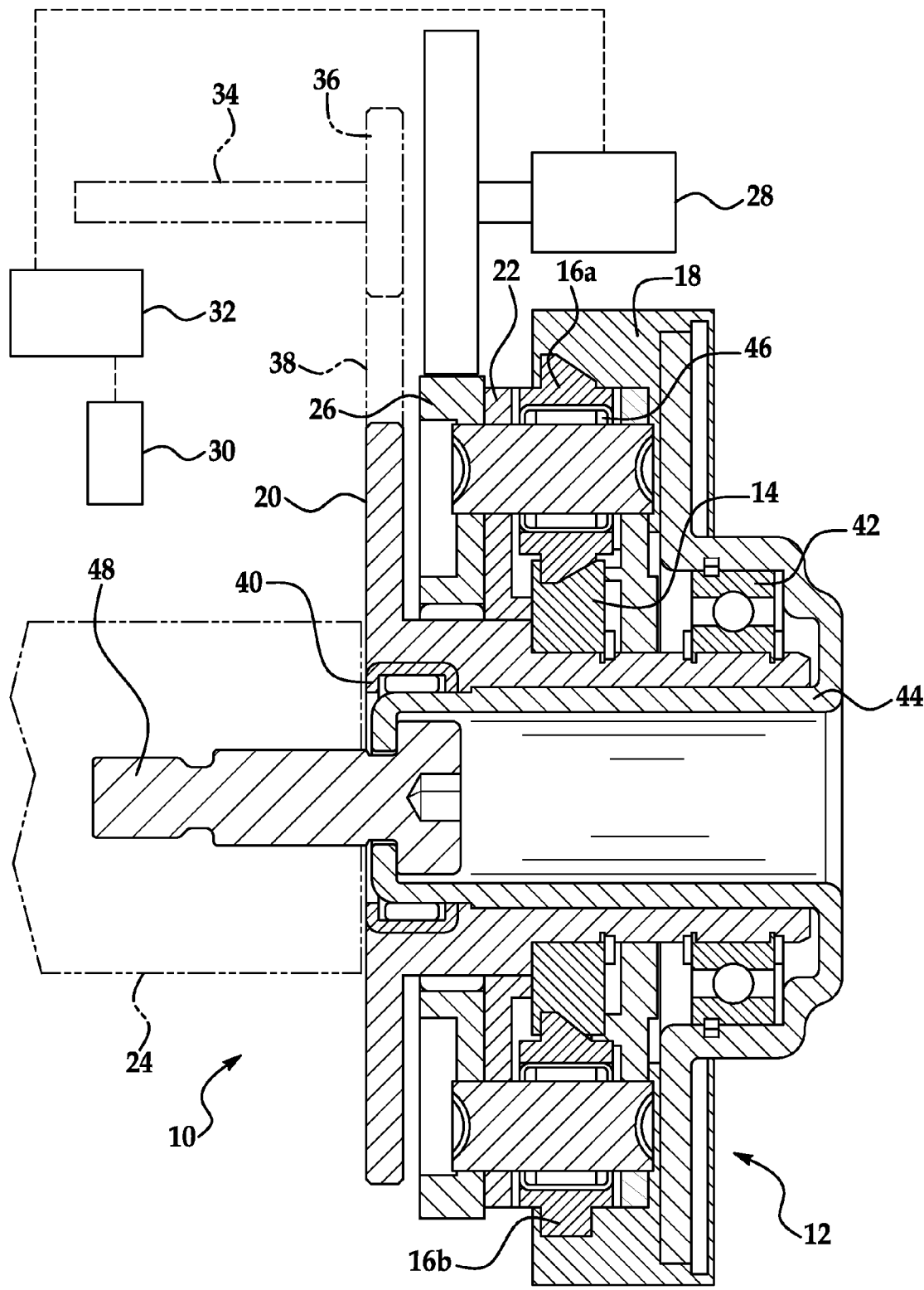
FIG. 2 is a cross section view of the electric motor driven simple planetary cam phaser of FIG. 1.

Referring now to FIGS. 1-2, a cam phaser 10 can dynamically adjust a rotational relationship of a camshaft 24 of an internal combustion engine with respect to an engine crankshaft 34. A cam sprocket 20 can be driven by an endless loop power transmission member 38 connected to a drive sprocket 36 mounted for rotation with the engine crankshaft 34. The cam phaser can include a planetary gear system or drive train 12 having a centrally located sun gear 14 connected for rotation with the cam sprocket 20. A ring gear 18 can be connected for rotation with the camshaft 24, and a plurality of planet gears 16a, 16b can be supported by a carrier 22 in meshing engagement between the sun gear 14 and the ring gear 18. A phase adjustment gear 26 can be connected for rotation with the carrier 22. The sun gear 14 can drives the planet gears 16a, 16b in rotation, thereby causing the ring gear 18 to be driven in rotation. Rotational movement of the phase adjustment gear 26 can adjustably vary a cam phase position of the camshaft 24 relative to the crankshaft 34.

The cam sprocket 20 can be mounted for rotation with respect to a camshaft axis and drivably connected with the drive sprocket 36 to be driven thereby at a first drive ratio less than 1:1. The planetary gear drive train 12 can be drivably connected between the cam sprocket 20 and the camshaft 24 for driving the camshaft 24 at a second drive ratio greater than 0.5:1. A product of the first drive ratio and the second drive ratio can equal an overall combined drive ratio of 0.5:1. In other words, the drive sprocket 36 to cam sprocket 20 drive ratio can be less than 1:1, and a planetary gear ratio, of sun gear 14 to ring gear 18 with the carrier 22 held stationary, can be greater than 0.5:1, such that a product of the drive sprocket 36 to cam sprocket drive ratio with the planetary gear ratio can equal an overall combined drive ratio of 0.5:1.

An electric motor 28 can be connected for rotating the phase adjustment gear 26. The electric motor 28 can drive the phase adjustment gear 26 in rotational movement, thereby changing an angular position of the carrier 22 resulting in a cam phase position change of the camshaft 24 relative to the crankshaft 34. A sensor 30 can be provided to supply a feedback signal to a controller 32 of the electric motor 28 to measure a current position of the cam sprocket 24 relative to the camshaft 24 to determine if any cam phase position adjustment is required. If a cam phase position adjustment is required, the electric motor 28 is driven by the controller 32 to move the cam phase position toward the desired location, in either an advancing or retarding direction, through rotational movement of the carrier 22, thereby causing relative rotation of the plurality of planet gears 16*a*, 16*b* driving the ring gear 18 and connected camshaft 24 to achieve a cam phase position adjustment of the camshaft 24 relative to the crankshaft 34.

It should be recognized that various configuration of the planetary gear drive train 12 can be provided. By way of example and not limitation, the phase adjustment gear 26 can be formed as a worm gear. It should further be recognized that to reduce noise, the sun gear 14, the ring gear 18, and the plurality of planet gears 16*a*, 16*b* can be formed having helical gear teeth.

A simple planetary gearset 12 with a fixed carrier 22 can drive the camshaft 24 at a ratio that when multiplied by the ratio between the engine crank sprocket 36 and the phaser input cam sprocket 20 results in an overall ratio of 0.5:1. An electric motor 28 can be arranged such that the electric motor 28 can rotationally drive the carrier 22 to achieve the desired cam phasing.

The desired phasing can be accomplished in a simple manner which can also reduce a clearance diameter required for the planetary gear system 12. Reduction of the clearance diameter can allow a lower hood contour in a vehicle allowing greater freedom in styling and potentially improved aerodynamics of the vehicle. Normally, the camshaft 24 rotates at half of the speed of the engine crankshaft 34. This can be accomplished in the absence of a cam phaser by having two times as many teeth in the cam sprocket 20 as the engine sprocket 36. By way of example and not limitation, the engine sprocket 36 can have nineteen (19) teeth which would require thirty-eight (38) teeth in the cam sprocket 20 driving the camshaft 24 to achieve the desired drive ratio. With the use of a planetary gearset 12, the number of teeth in the cam sprocket 20 can be reduced to twenty (20) teeth, which gives a drive ratio of 0.95:1. Using a planetary gearset 12 where the ring gear 18 has seventy-six (76) teeth, each of the planet gears 16*a*, 16*b* has eighteen (18) teeth, and the sun gear 14 has forty (40) teeth, the planetary reduction ratio of the sun gear 14 to the ring gear 18 with the carrier 22 held stationary is 0.526316:1. When this ratio is multiplied by the sprocket ratio of 0.95:1, the result is exactly 0.5:1 which is the desired speed of the camshaft 24. If the carrier 22 can be rotated by a high ratio worm phase adjustment gear 26, rotation of the carrier 22 results in a change in the phasing angle of the input cam sprocket 20 to the camshaft 24.

The input cam sprocket 20 can include a splined connection or other rotationally secure joint of the sun gear 14 with respect to the cam sprocket 20. The sun gear 14 can be axially retained by a snap ring (not numbered). The input cam sprocket 20 and sun gear 14 are rotationally located with respect to the output plate 44 by bearings 40, 42. Bearing 42 also holds the input cam sprocket 20 in axial relationship to the output plate 44 by three snap rings (not numbered), and a thrust surface of the output plate 44 at the outer race of the ball bearing 42. The carrier 22 can be secured to the phase adjustment worm gear 26 and is normally held in a fixed position. The sun gear 14 can drive the multiple planet gears 16*a*, 16*b* causing the planet gears 16*a*, 16*b* to rotate around the planet pins on bearings 46. The planet gears 16*a*, 16*b* drive the ring gear 14 in the opposite direction with respect to the input cam sprocket 20.

The output plate 44 can be secured axially and rotationally to the ring gear 14 and bolted to the camshaft 24 by bolt 48. Therefore the ring gear 14, and output plate 44 rotate as one unit with the camshaft 24. Since this planetary gearset 12 is a dynamic gearset and can produce noise from the meshing of the gear teeth, the teeth of the ring gear 14, the teeth of the planetary gears 16*a*, 16*b*, and the teeth of the sun gear 14 can be formed as helical teeth to reduce noise. An electric motor 28 can be secured to the engine block indirectly and connected in a geared engagement to the worm phase adjustment gear 26. When the electric motor 28 drives the phase adjustment worm gear 26, the angular position of the carrier 22 is changed which results in a phasing change between the input cam sprocket 20 and the camshaft 24. A sensor 30 can be used as feedback to a motor controller 32 to measure the current position of the cam sprocket 20 to the camshaft 24 to determine what adjustment, if any, is desired at any point in time to achieve optimal engine efficiency. It should be recognized by those skilled in the art that many different ratios are achievable with the disclosed invention and the invention is not limited to the specific configuration illustrated and discussed with respect to FIGS. 1 and 2.

A method for assembling and for dynamically adjusting a rotational relationship of a camshaft of an internal combustion engine with respect to an engine crankshaft is disclosed. A cam sprocket 20 can be driven by an endless loop power transmission member 38 connected to a drive sprocket 36 mounted for rotation with the engine crankshaft 34. The method can include assembling a planetary gear drive train 12 having a centrally located sun gear 14 connectable for rotation with the cam sprocket 20. A ring gear 18 can be connectable for rotation with the camshaft 24, and a plurality of planet gears 16*a*, 16*b* can be supported by a carrier 22 in meshing engagement between the sun gear 14 and the ring gear 18. A phase adjustment gear 26 can be connected for rotation with the carrier 22. The sun gear 14 can drive the planet gears 16*a*, 16*b* in rotation, thereby causing the ring gear 18 to be driven in rotation. Rotational movement of the phase adjustment gear 26 can adjustably vary a cam phase position of the camshaft 24 relative to the crankshaft 34.

An electric motor 28 can be connected for rotating the phase adjustment gear 26. The electric motor 28 can drive the phase adjustment gear 26 in rotational movement, thereby changing an angular position of the carrier 22 resulting in a cam phase position change of the camshaft 24 relative to the crankshaft 34. A cam phase position of the camshaft 24 relative to the crankshaft 34 can be adjustably varied with rotational movement of the phase adjustment gear 26. A current position of the cam sprocket 20 can be measured relative to the camshaft 24 with a sensor 30. A feedback signal can be provided from the sensor 30 to a controller 32 of the electric motor 28 to determine if any cam phase position adjustment is required.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a cam phaser (10) for dynamically adjusting a rotational relationship of a camshaft (24) of an internal combustion engine with respect to an engine crankshaft (34), a cam sprocket (20) driven by an endless loop power transmission member (38) connected to a drive sprocket (36) mounted for rotation with the engine crankshaft (34), an improvement of the cam phaser comprising:

a planetary gear system (12) having a centrally located sun gear (14) connected for rotation with the cam sprocket (20), a ring gear (18) connected for rotation with the camshaft (24), and a plurality of planet gears (16 a, 16b) supported by a carrier (22) in meshing engagement between the sun gear (14) and the ring gear (18); and a phase adjustment gear (26) connected for rotation with the carrier (22), wherein the sun gear (14) drives the planet gears (16a, 16b) in rotation thereby causing the ring gear (18) to be driven in rotation, and rotational movement of the phase adjustment gear (26) adjustably varies a cam phase position of the camshaft (24) relative to the crankshaft (34).

2. The improvement of the cam phaser of claim 1 further comprising:

the drive sprocket (36) to cam sprocket (20) drive ratio being less than 1:1; and a planetary gear ratio of sun gear (14) to ring gear (18) with the carrier (22) held stationary being greater than 0.5:1, such that a product of the drive sprocket (36) to cam sprocket (20) drive ratio with the planetary gear ratio equals an overall combined drive ratio of 0.5:1.

3. The improvement of the cam phaser of claim 1 further comprising:

an electric motor (28) connected for rotating the phase adjustment gear (26), wherein the electric motor (28) drives the phase adjustment gear (26) in rotational movement, thereby changing an angular position of the carrier (22) resulting in a cam phase position change of the camshaft (24) relative to the crankshaft (34).

4. The improvement of the cam phaser of claim 3 further comprising:

a sensor (30) providing feedback to a controller (32) of the electric motor (28) to measure a current position of the cam sprocket (20) relative to the camshaft (24) to determine if a cam phase position adjustment is required.

5. The improvement of the cam phaser of claim 1, wherein the phase adjustment gear (26) is a worm gear.

6. The improvement of the cam phaser of claim 1, wherein the sun gear (14), the ring gear (18), and the plurality of planet gears (16a, 16b) have helical gear teeth.

7. A cam phaser (10) for dynamically adjusting a rotational relationship of a camshaft (24) of an internal combustion engine with respect to an engine crankshaft (34), a cam sprocket (20) driven by an endless loop power transmission member (38) connected to a drive sprocket (36) mounted for rotation with the engine crankshaft (34), the cam phaser (10) comprising:

a planetary gear drive train (12) having a centrally located sun gear (14) connectable for rotation with the cam sprocket (20), a ring gear (18) connectable for rotation with the camshaft (24), and a plurality of planet gears (16a, 16b) supported by a carrier (22) in meshing engagement between the sun gear (14) and the ring gear (18); and a phase adjustment gear (26) connected for rotation with the carrier (22), wherein the sun gear (14) drives the planet gears (16a, 16b) in rotation thereby causing the ring gear (18) to be driven in rotation, and rotational movement the phase adjustment gear (26) adjustably varies a cam phase position of the camshaft (24) relative to the crankshaft (34).

8. The cam phaser of claim 7 further comprising:

the cam sprocket (20) mounted for rotation with respect to a camshaft axis and drivably connected with the drive sprocket (36) to be driven thereby at a first drive ratio less than 1:1; and the planetary gear drive train (12) drivably connected between the cam sprocket (20) and the camshaft (24) for driving the camshaft (24) at a second drive ratio greater than 0.5:1, such that a product of the first drive ratio and the second drive ratio equals a combined drive ratio of 0.5:1.

9. The cam phaser of claim 7 further comprising:

an electric motor (28) connected to the phase adjustment gear (26), wherein the electric motor (28) rotates the phase adjustment gear (26), thereby changing an angular position of the carrier (22) resulting in a cam phase position change of the camshaft (24) relative to the crankshaft (34).

10. The cam phaser of claim 9 further comprising:

a sensor (30) providing feedback to a controller (32) of the electric motor (28) to measure a current position of the cam sprocket (20) relative to the camshaft (24) to determine if a cam phase position adjustment is required.

11. The cam phaser of claim 7, wherein the phase adjustment gear (26) is a worm gear.

12. The cam phaser of claim 7, wherein the sun gear (14), the ring gear (18), and the plurality of planet gears (16a, 16b) have helical gear teeth.

13. A method for assembling and for dynamically adjusting a rotational relationship of a camshaft (24) of an internal combustion engine with respect to an engine crankshaft (34), a cam sprocket (20) driven by an endless loop power transmission member (38) connected to a drive sprocket (36) mounted for rotation with the engine crankshaft (34), the method comprising:

assembling a planetary gear drive train (12) having a centrally located sun gear (14) connectable for rotation with the cam sprocket (20), a ring gear (18) connectable for rotation with the camshaft (24), and a plurality of planet gears (16a, 16b) supported by a carrier (22) in meshing engagement between the sun gear (14) and the ring gear (18); and connecting a phase adjustment gear (26) for rotation with the carrier (22), wherein the sun gear (14) drives the planet gears (16a, 16b) in rotation thereby causing the ring gear (18) to be driven in rotation, and rotational movement of the phase adjustment gear (26) adjustably varies a cam phase position of the camshaft (24) relative to the crankshaft (34).

14. The method of claim 13 further comprising:

connecting an electric motor (28) for rotating the phase adjustment gear (26), wherein the electric motor (28) drives the phase adjustment gear (26) in rotational movement, thereby changing an angular position of the carrier (22) resulting in the cam phase position change of the camshaft (24) relative to the crankshaft (34); and adjustably varying a cam phase position of the camshaft (24) relative to the crankshaft (34) with rotational movement of the phase adjustment gear (26).

15. The method of claim 14 further comprising:

measuring a current position of the cam sprocket (20) relative to the camshaft (24) with a sensor (30); and providing a feedback signal from the sensor (30) to a controller (32) of the electric motor (28) to determine if a cam phase position adjustment is required.

\* \* \* \* \*